United States Patent

Sugita et al.

[11] Patent Number: 5,873,434
[45] Date of Patent: Feb. 23, 1999

[54] BRAKE APPARATUS FOR AN ELEVATOR HOISTING MACHINE

[75] Inventors: Kazuhiko Sugita; Kunio Katou, both of Tokyo, Japan

[73] Assignee: Mitsubishi Denki Kabushiki Kaisha, Tokyo, Japan

[21] Appl. No.: 705,994

[22] Filed: Aug. 30, 1996

[30] Foreign Application Priority Data

Oct. 31, 1995 [JP] Japan ................................. 7-283467

[51] Int. Cl.⁶ ........................................................ B66B 1/32
[52] U.S. Cl. ............................................ 187/288; 188/171
[58] Field of Search .................................. 187/350, 288, 187/298; 188/171

[56] References Cited

U.S. PATENT DOCUMENTS

| | | | |
|---|---|---|---|
| 926,620 | 6/1909 | Sundh | 187/288 |
| 1,304,870 | 5/1919 | Gale, Jr. | 187/288 |
| 1,713,228 | 5/1929 | Harrington | 187/288 |
| 4,181,201 | 1/1980 | McCarthy | 188/171 |
| 4,526,252 | 7/1985 | Hirano | 187/20 |
| 4,798,269 | 1/1989 | Lindner et al. | 188/171 |
| 4,923,055 | 5/1990 | Holland | 188/171 |
| 5,014,828 | 5/1991 | Baldassarre | 187/288 |
| 5,109,958 | 5/1992 | Kato et al. | 187/20 |
| 5,153,389 | 10/1992 | Nomura | 187/108 |
| 5,186,288 | 2/1993 | Sommer | 188/171 |
| 5,242,039 | 9/1993 | Mabee | 188/171 |
| 5,253,738 | 10/1993 | Vertesy et al. | 188/171 |
| 5,265,701 | 11/1993 | Ogasawara et al. | 188/171 |
| 5,518,087 | 5/1996 | Hwang et al. | 188/171 |
| 5,582,277 | 12/1996 | Heidenreich et al. | 188/171 |

FOREIGN PATENT DOCUMENTS 50-154669  12/1975  Japan.
4-313590  11/1992  Japan.

*Primary Examiner*—William E. Terrell
*Assistant Examiner*—Khoi H. Tran
*Attorney, Agent, or Firm*—Leydig, Voit & Mayer

[57] ABSTRACT

In a brake apparatus for a hoisting machine of an elevator, a field magnet and an armature of an electromagnetic actuator are mounted directly to brake arms supporting brake shoes. Therefore, members for transmitting the motion of an electromagnetic actuator into the motion of the brake arms can be omitted, whereby the number of parts and the overall size of the hoisting machine can be reduced, and maintenance operations can be performed easily at lower positions.

10 Claims, 12 Drawing Sheets

BRAKE APPARATUS FOR AN ELEVATOR HOISTING MACHINE

BACKGROUND OF THE INVENTION

1. Field of the Invention

The present invention relates to a brake apparatus for an elevator hoisting machine for braking a brake disk which is fixed to a rotating shaft, for example, an input shaft, for transmitting the rotational force of a drive motor of the hoisting machine to a driving sheave.

2. Description of the Related Art

FIG. 9 is a partially cutaway front view showing a conventional brake apparatus such as disclosed in Japanese Patent Laid-Open No. 4-313590. FIG. 10 is a plan view of FIG. 9. FIG. 11 is a plan view showing an elevator hoisting machine of an elevator which has the brake apparatus of FIG. 9. FIG. 12 is a side view of FIG. 11. In the figures, a hoisting machine body 1 has a speed-reduction gear unit, an input shaft 1a and an output shaft 1b. A rotating force of a drive motor 11 is transmitted to the input shaft 1a, that is a rotating shaft. A driving sheave 2 is fixed to the output shaft 1b.

A brake disk 3 is fixed to the input shaft 1a. A pair of brake arms 4 located at both sides of the brake disk 3 are attached to a housing 5 of the hoisting machine body 1 rotatably through arm pins 4a. Each brake arm 4 has a brake shoe 6 which are contacted with and separated from the brake disk 3 by rotation of the brake arms 4. The brake arms 4 are biased by springs 7 so that the brake shoes 6 are pressed against the brake disk 3.

A pair of levers 8 are attached to the housing 5 rotatably through lever pins 9. When the levers 8 are rotated, the brake arms 4 rotate against the forces of the springs 7, thereby separating the brake shoes 6 from the brake disk 3. An electromagnetic actuator 10 has a plunger 10a which reciprocates in its axial direction. One end portion of the plunger 10a touches the levers 8.

Further, the other end portion of the plunger 10a touches a switch 12 which detects the motion of the plunger 10a, as shown in FIG. 10.

The operation will now be described. The brake disk 3 is frictionally braked by pressing the brake shoes 6 to both side surfaces of the brake disk 3. The pressing forces of the brake shoes 6 is obtained by magnifying the compressive forces of the springs 7 through the brake arms 4. On the other hand, in the case of releasing a braking force, the brake arms 4 are pushed against the compressive forces of the springs 7 by the levers 8. The pushing forces against the brake arms 4 are obtained by magnifying the projecting force of the electromagnetic actuator 10 through the levers 8.

Further, at the time of releasing the braking force, the motion of the plunger 10a is detected by the switch 12, thereby starting the drive motor 11. Furthermore, at the time of maintenance and inspection, when the end portion of a hand-operated release lever (not shown) constructed separately from the brake apparatus contacts the levers 8 and is moved along the axial direction of the plunger 10a, the braking force will be manually released.

In the conventional brake apparatus constructed as described above, it is necessary to transmit the linear motion of the plunger 10a of the electromagnetic actuator 10 to the rotary motion of the brake arms 4 through the levers 8, thereby increasing the number of parts and cost. Further, since the electromagnetic actuator 10 is disposed on the hoisting machine body 1, the size of the whole hoisting machine is increased, while workability at the time of maintenance and inspection is reduced. Especially, when the plunger 10a is removed during maintenance and inspection, it is necessary to first remove the switch 12. Also, the switch 12 is disposed at a high and deep position, so removing the plunger 10a requires much time and labor.

SUMMARY OF THE INVENTION

The present invention has been achieved with a view toward solving the problems described above, and it is an object of the present invention to provide a brake apparatus for an elevator hoisting machine which is capable of decreasing the number of parts required, permitting a reduction in the size of the whole hoisting machine, and facilitating maintenance and inspection operations.

To this end, according to one aspect of the present invention, there is provided a brake apparatus for an elevator hoisting machine including a drive motor, driving sheave and a rotating shaft for transmitting a rotating force of said drive motor to said driving sheave, said brake apparatus comprising: a brake disk disposed on said rotating shaft for rotation therewith; a pair of brake arms pivotally supported from said hoisting machine; a brake shoe mounted to each of said brake arms for frictional braking of said brake disk; a spring for biasing said brake arms to urge said brake shoes against said brake disk; and an electromagnetic actuator including a field magnet and an armature at least one of which mounted to one of said brake arms for separating said brake shoes from said brake disk against the action of said spring when said electromagnetic actuator is energized.

According to another aspect of the present invention, there is provided a brake apparatus for an elevator hoisting machine, including a drive motor, driving sheave and a rotating shaft for transmitting a rotating force of said drive motor to said driving sheave, said brake apparatus comprising: a brake disk disposed on said rotating shaft for rotation therewith; a pair of brake arms pivotally supported from said hoisting machine, each of said brake arms having a first end portion and a second end portion; a brake shoe mounted to each of said second end portion of said brake arms for frictional braking of said brake disk; a spring for biasing said brake arms to urge said brake shoes against said brake disk; an electromagnetic actuator for separating said brake shoes from said brake disk against the action of said spring when said electromagnetic actuator is energized; a switch mounted to said first end portion of one of said pair of brake arms; and an operating member provided on the other of said pair of brake arms for operating said switch at the time of releasing said braking force.

DETAILED DESCRIPTION OF THE PREFERRED EMBODIMENTS

The embodiments according to the present invention will now be described with reference to the accompanying drawings.

First Embodiment

Figure 1:
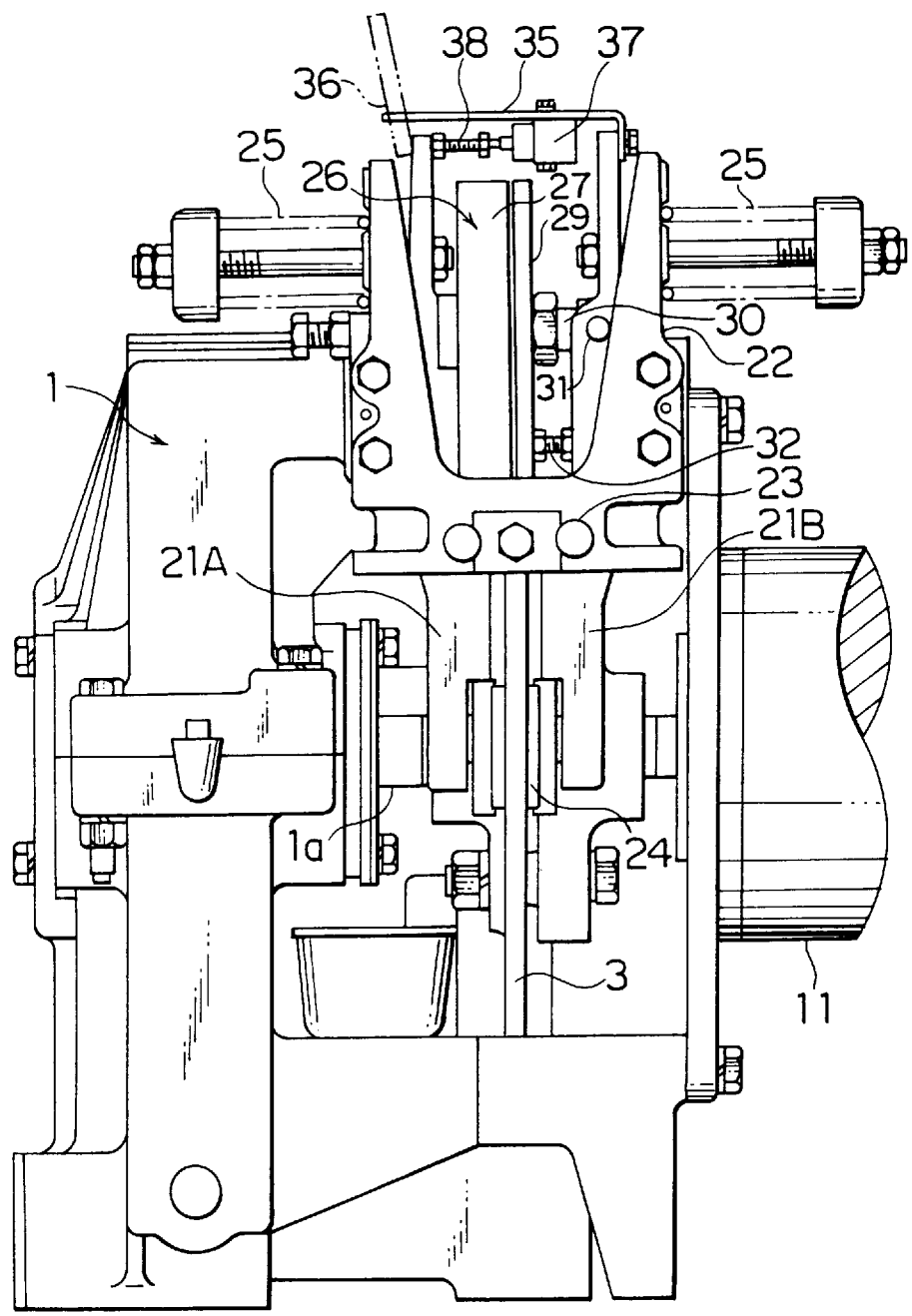
FIG. 1 is a front view showing a brake apparatus for an elevator hoisting machine as a first embodiment of the invention.
Figure 2:
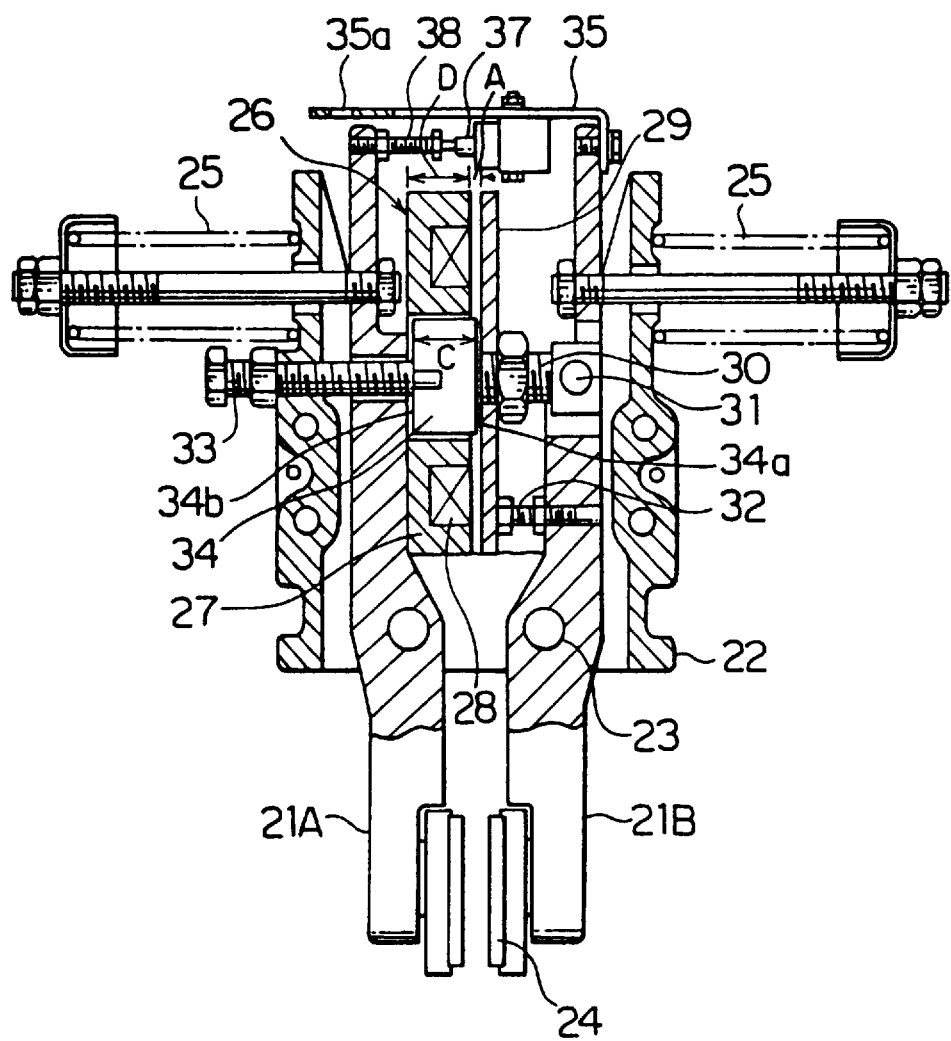
FIG. 2 is a cross-sectional view showing essential portions of FIG. 1.
Figure 3:
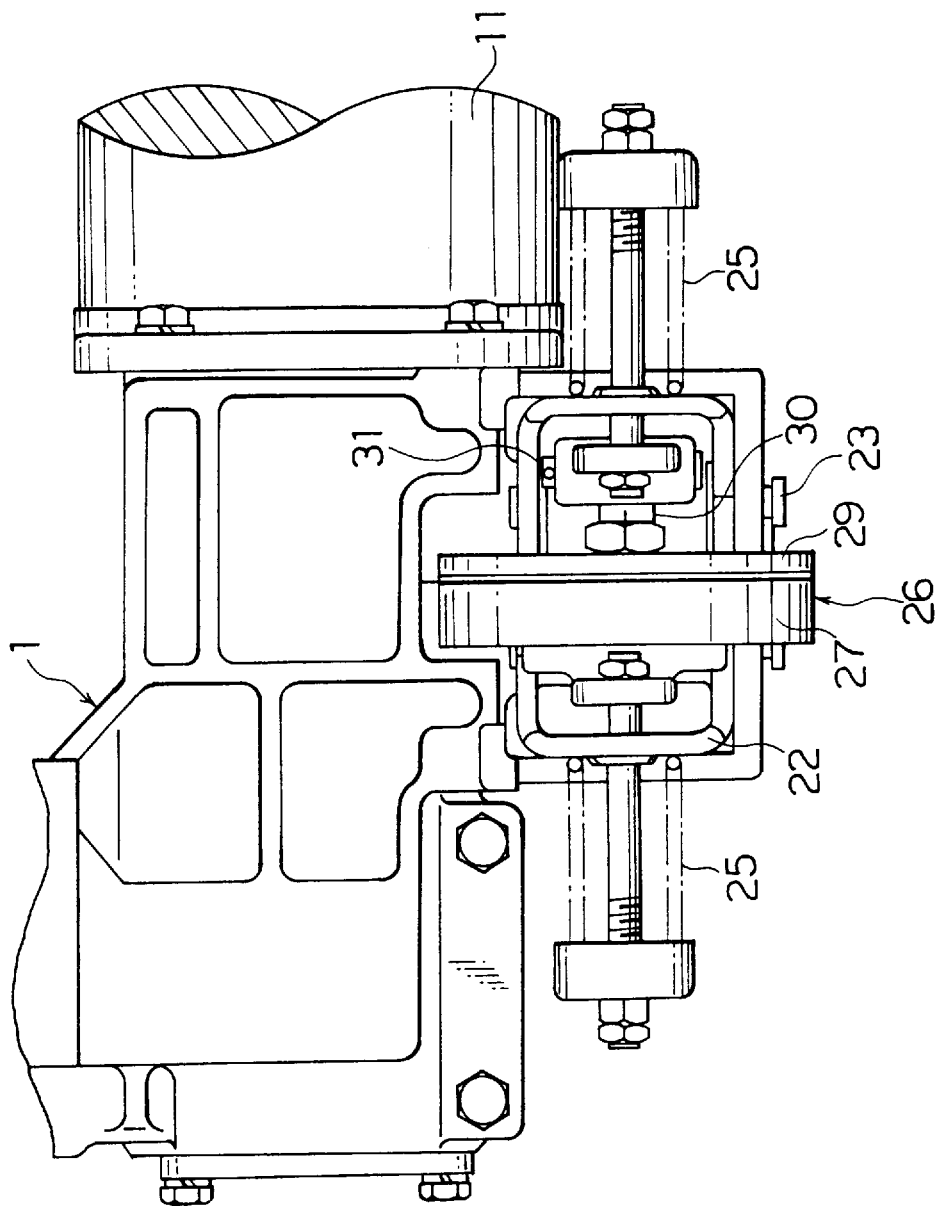
FIG. 3 is a plan view of FIG. 1.
Figure 4:
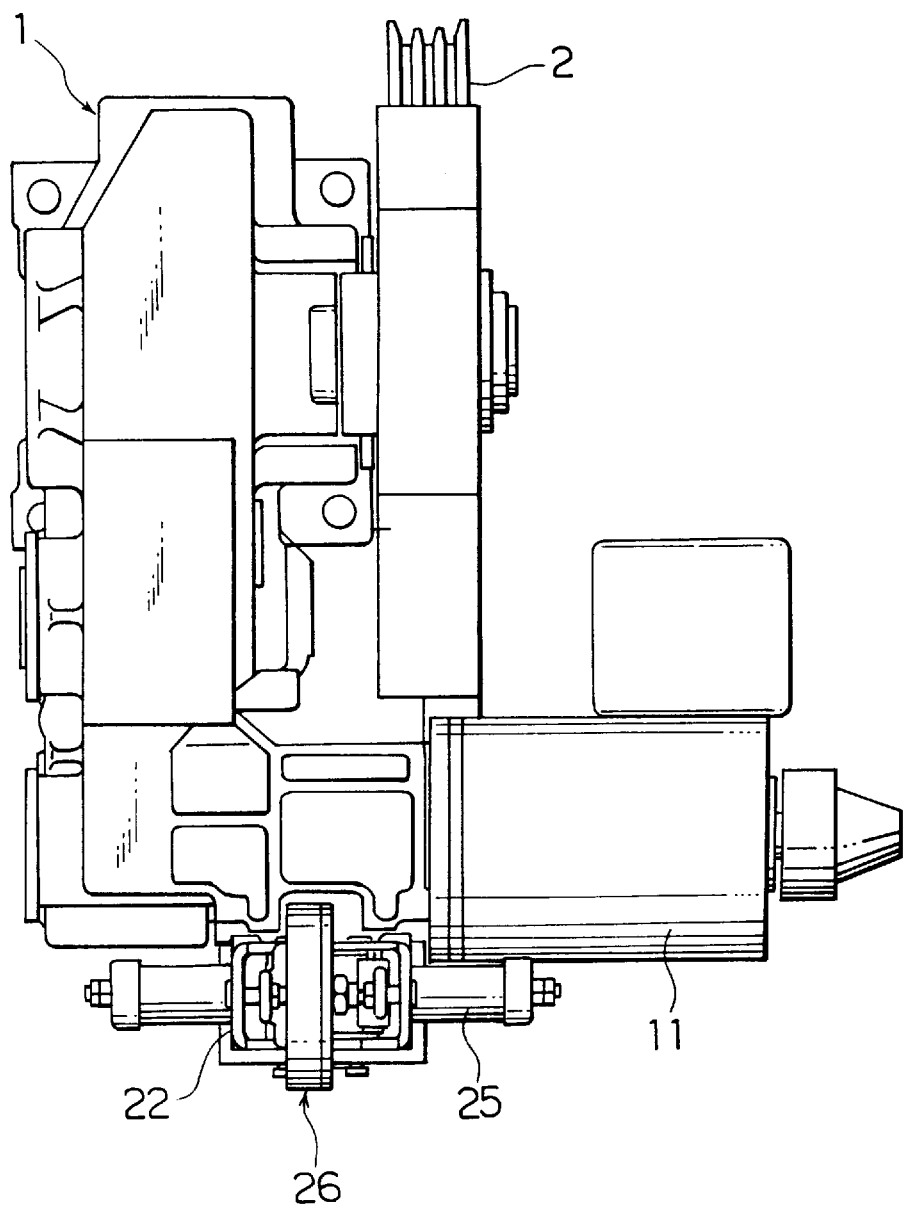
FIG. 4 is a plan view showing an elevator hoisting machine which has the brake apparatus of FIG. 1.
Figure 5:
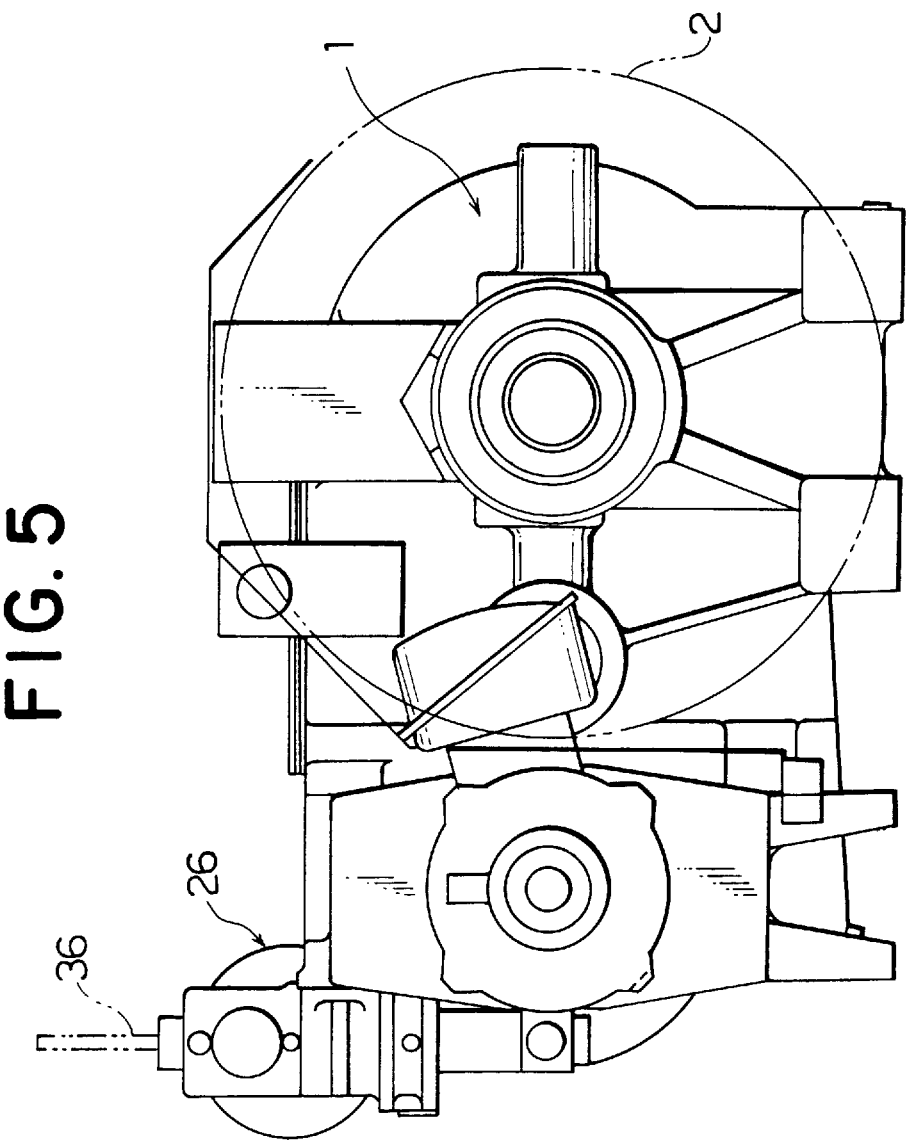
FIG. 5 is a side view of FIG. 4.

FIG. 1 is a front view showing a brake apparatus for an elevator hoisting machine as the First Embodiment of the invention. FIG. 2 is a cross-sectional view showing the essential portions of FIG. 1. FIG. 3 is a plan view of FIG. 1. FIG. 4 is a plan view showing an elevator hoisting machine which has the brake apparatus of FIG. 1. FIG. 5 is a side view of FIG. 4. The parts which are the same as or corresponding to those shown in FIGS. 9 to 12 will be given the same reference numerals and the description thereof will be omitted.

In the figures, a pair of brake arms 21A, 21B located at both sides of the brake disk 3 are attached to a housing 22 of the hoisting machine body 1 rotatably through arm pins 23. Brake shoes 24 for contacting with and separating from the brake disk 3 by rotation of the brake arms 21A, 21B are attached to the bottom end portion as a second end portion of each brake arm 21A, 21B, respectively. The brake arms 21A, 21B are biased by springs 25 so that the brake shoes 24 are pressed against the brake disk 3.

An annular field magnet 27 of an electromagnetic actuator 26 is fixed to one brake arm 21A at the opposite side of the arm pin 23 as the brake shoe 24 through a suitable fixing means, such as a bolt. The field magnet 27 is provided with a coil 28. An armature 29 of the electromagnetic actuator 26 is attached to the other brake arm 21B through a pivot pin 30 so as to contact with and separate from the field magnet 27. The pivot pin 30 is attached to the arm 21B through a pin 31 so as to be freely rotatable. An adjustment bolt 32 as an adjustment mechanism is screwed into the brake arm 21B on the armature 29 side so that the tip portion of the adjustment bolt 32 contacts the armature 29. The adjustment bolt 32 is used for adjusting the fitting angle of the armature 29 so that the armature 29 is parallel to the field magnet 27.

A stopper bolt 33 passing through the brake arm 21A on the field magnet 27 side is screwed into the housing 22. A stopper 34 is fixed to the end of the stopper bolt 33. The stopper 34 has a contact surface 34a which contacts the armature 29 at the time of releasing the braking force, and a contact surface 34b which contacts the brake arm 21A. The stopper 34 is disposed in a space located at the center of the field magnet 27. The contact surface 34a is positioned at the center of a gap A created between the field magnet 27 and the armature 29 in a separated state. Further, the position of the contact surface 34a is adjustable in the right and left directions of FIG. 2.

The base end portion of a mounting member 35 is fixed on the armature 29 side of the upper end portion as a first end portion of the brake arm 21B. The other end portion of the mounting member 35 extends to the vicinity of the brake arm 21A of the field magnet 27 side. As shown in FIG. 2, the mounting member 35 is provided with a hole 35a for inserting a rod like hand release lever 36 (FIG. 1) for manually rotating the brake arms 21A, 21B.

A switch 37 is fitted to the middle portion of the mounting member 35. An operating bolt 38 acting as an operating member for operating the switch 37 at the time the brake force is released is adjustably fixed to the top portion of the brake arm 21A on the field magnet 27 side.

The operation will now be described. When a car is stopped, no electric current is sent to the electromagnetic actuator 26 and the brake shoes 24 are pressed against both side surfaces of the brake disk 3 by the brake arms 21A, 21B. Therefore, the input shaft 1a is locked so it can not be rotated, and the car can not run up or down.

In contrast, when the car is run up or down, an electric current is sent to the coil 28 of the electromagnetic actuator 26, thereby pulling the field magnet 27 and the armature 29 toward each other to rotate the brake arms 21A, 21B around the arm pins 23 against the spring forces of the springs 25 respectively. Therefore, the brake shoes 24 are separated from both side surfaces of the brake disk 3 so as to allow the rotation of the input shaft 1a. Further, when the brake arms 21A, 21B are rotated, the switch 37 is operated by the operating bolt 38, whereby the release of the brake is detected, so an electric current may be sent to the drive motor 11 to run the car up or down.

When the brake arms 21A, 21B are not rotated even though an electric current is sent to the electromagnetic actuator 26, the switch 37 remains in its OFF position. In this abnormal case, the car can not be run. The operation timing for ON and OFF of the switch 37 is adjusted by adjusting the screw depth of the operating bolt 38.

In this brake apparatus, since the field magnet 27 and the armature 29 of the electromagnetic actuator 26 are mounted directly to the brake arms 21A, 21B, members for changing the motion of the electromagnetic actuator 26 to the motion of the brake arms 21A, 21B can be omitted, thereby reducing the number of parts and the size of whole hoisting machine, so that maintenance and inspection operations can be easily carried out at a lower position. Particularly, overhaul cleaning, cleaning, checking and oiling are easily performed after merely locking the input shaft 1a by pressing one brake shoe 24 to the brake disk 3 and removing the other brake arm. Also, assembly at the factory is facilitated.

Further, when the armature 29 ceases to be parallel with the field magnet 27 due to wearing of the brake shoes 24 or the like, parallel state can be easily restored by adjusting the projection length of the adjustment bolt 32 from the brake arm 21B.

The brake arm 21B supporting the armature 29 which is lighter in weight than the field magnet 27 moves smoother than the brake arm 21A supporting the field magnet 27. Therefore, the fear exists that only the brake arm 21B of the armature 29 side may be rotated while the brake arm 21A of the field magnet 27 side is not. However, both brake arms 21A, 21B are rotated equally because of the existence of the stopper 34. In other wards, after armature 29 contacts the contact surface 34a of the stopper 34, the brake arm 21B of the armature 29 side can no longer rotate and so only the brake arm 21A of the field magnet 27 side is rotated, whereby gaps of equal size are generated between both side surfaces of the brake disk 3 and brake shoes 24.

Further, the stopper 34 is provided with the contact surface 34b which is contacted the brake arm 21A to prevent only the brake arm 21A from rotating at the time the brake force is released while the brake arm 21B does not, for some reason, rotate. In other words, the rotation of the brake arm 21A in the direction of the brake shoe 24 separating the brake disk 3 is prevented. Accordingly, the thickness C, of the stopper 34, is designed so as to be the same as the thickness D, of the field magnet 27.

Furthermore, the position of the stopper 34 is adjustable together with the stopper bolt 33 in the right and left directions of FIG. 2, thereby rendering the contact position of the field magnet 27 and the armature 29 adjustable.

Also, the adjustment of gap A between the field magnet 27 and the armature 29 at during braking may be easily performed by merely rotating the armature 29 while keeping the field magnet 27 fixed. The gaps created between the brake disk 3 and the brake shoes 24 during the release of the brake force can be adjusted by adjusting gap A and adjusting the position of the stopper 34.

Further, since the brake shoes 24 are supported by the brake arms 21A, 21B through spherical surfaces, it is easy to adapt the degree to which the brake shoes 24 are parallel with the brake disk 3.

Furthermore, during maintenance or the like, the hand release lever 36 is inserted through the hole 35a of the mounting member 35 so that the tip portion of the lever 36 contacts the brake arm 21A, and the top portion of the lever 36 is inclined to the left in FIG. 1, thereby allowing the brake force to be manually released. Hence, the edge of the hole 35a acts as a fulcrum for the lever 36.

Moreover, adjustment and maintenance of the switch 37 can be easily performed at the lower positions of the front side of the hoisting machine, thereby improving operating efficiency. Further, in the prior art of FIG. 10, although it is necessary to remove the switch 12 to clean the plunger 10a, neither removing the switch 37 for cleaning nor reassembling after cleaning are necessary in this embodiment.

In the case of overhaul cleaning and oiling of the arm pins 23 during maintenance, a spring force which is double the regular spring force is used by compressing only one spring 25. Consequently, brake force is ensured by only one spring 25. Moreover, since the field magnet 27 and the armature 29 are divided, it is possible to loosen and remove the other spring 25, and to remove one arm pin 23 with its corresponding brake arm.

While, in the above embodiment, in regard to the brake apparatus wherein the electromagnetic actuator 26 is mounted to the brake arms 21A, 21B, the switch 35 and the operating bolt 38 are mounted to the brake arms 21A, 21B, it is also possible that the switch and the operating member can be mounted to the brake arms in regard to another type of brake apparatus for a hoisting machine if brake shoes are attached to a pair of brake arms.

Second Embodiment

Figure 6:
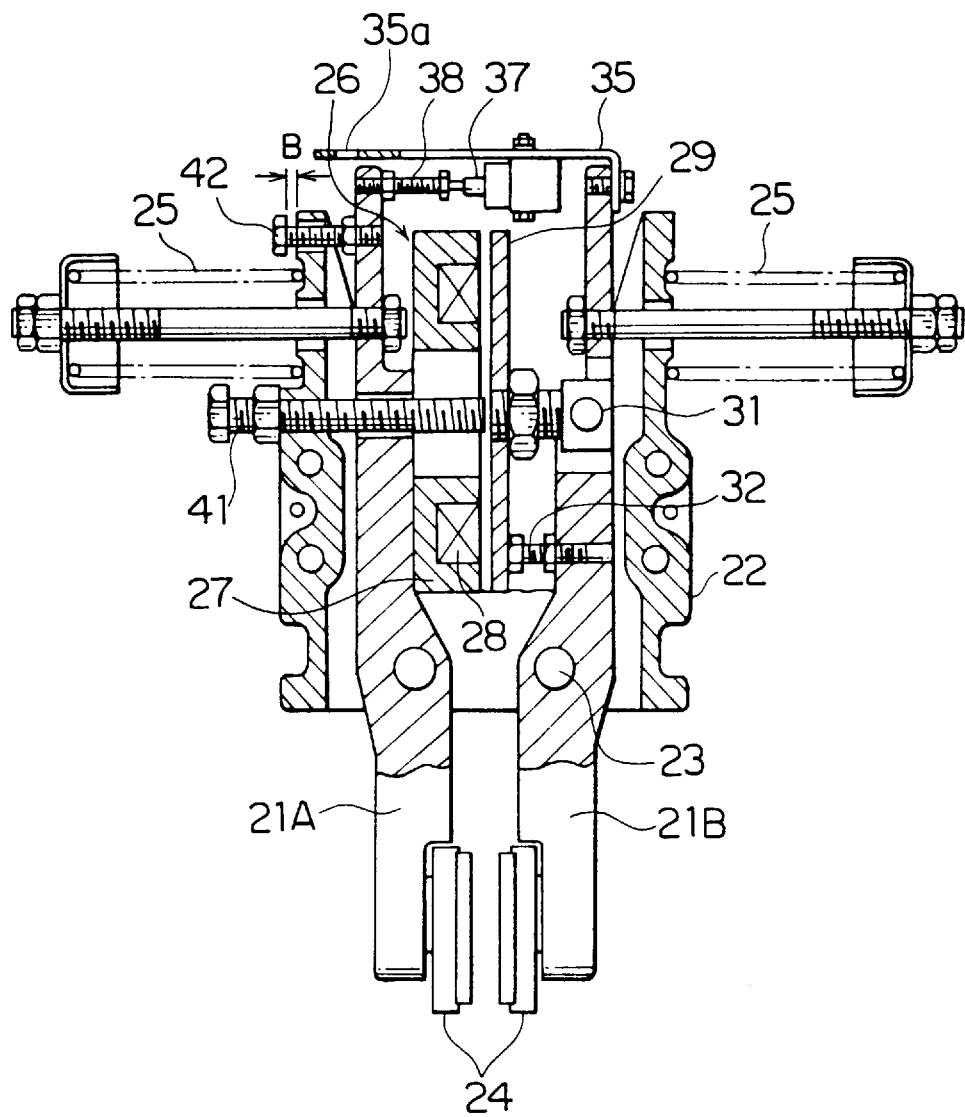
FIG. 6 is a cross-sectional view showing essential portions of a brake apparatus for an elevator hoisting machine as a second embodiment of the invention.

FIG. 6 is a cross-sectional view showing the essential portions of a brake apparatus for an elevator hoisting machine as a Second Embodiment of the invention. While the stopper 34 is fixed to the end of the stopper bolt 33 in the First Embodiment, a stopper bolt 41 is used as a stopper in this Second Embodiment. Accordingly, the stopper bolt 41 is assembled to the brake apparatus easily by inserting it from the outside of the housing 22.

Further, a bolt 42 is passed through the housing 22 and screwed into the brake arm 21A to prevent the rotation of only brake arm 21A at the time of releasing the braking force where the brake arm 21B does not rotate for some reason. In other words, the head portion of the bolt 42 contacts the housing 22 so as to prevent the rotation of the brake arm 21A in the direction of separation of the brake shoe 24 from the brake disk 3. Accordingly, a gap B between the bolt 42 and the housing 22 at the time of braking is designed in accordance with the gap between the brake shoe 24 and the brake disk 3 at the time of releasing the braking force. In other words, B≈ (gap between the brake shoe 24)×(distance between the arm pin 23 and the bolt 42)/(distance between the arm pin 23 and the brake shoe 24).

Third Embodiment

Figure 7:
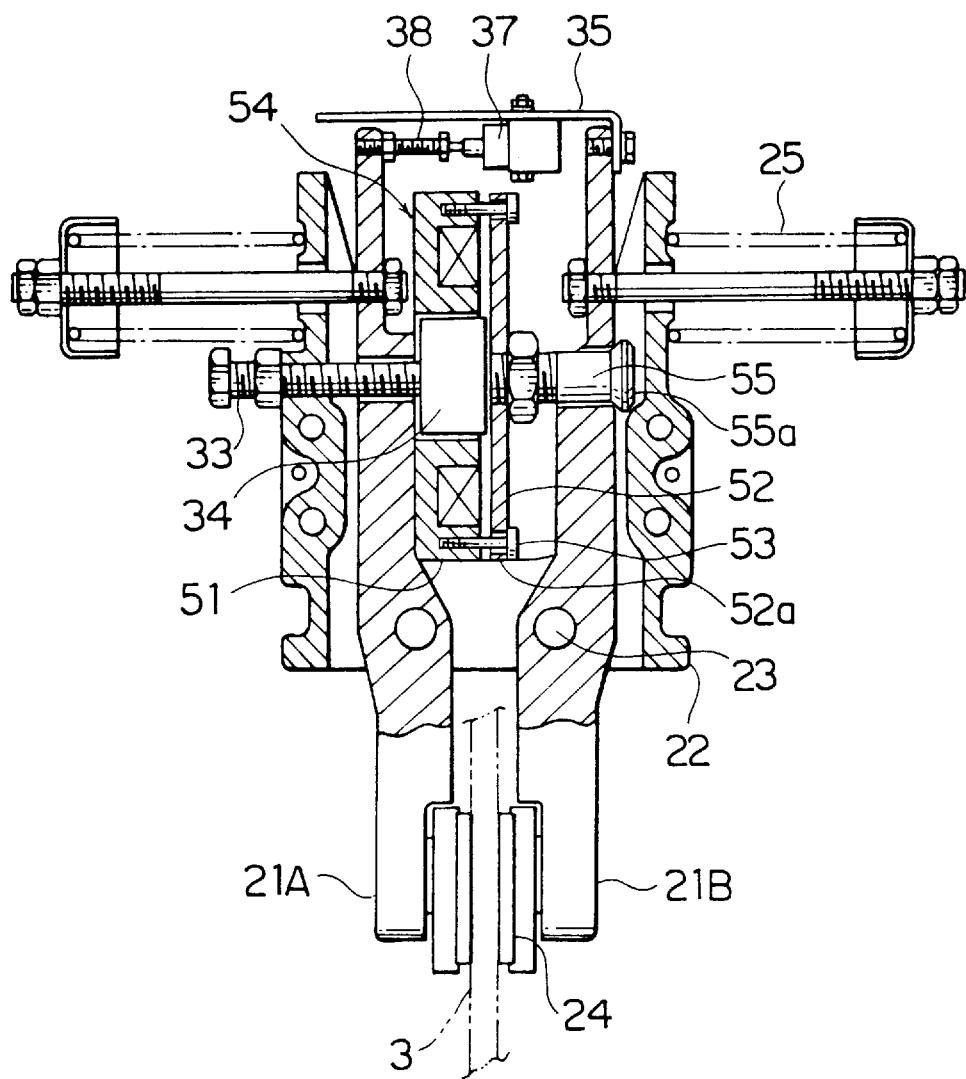
FIG. 7 is a cross-sectional view showing essential portions of a brake apparatus for an elevator hoisting machine as a third embodiment of the invention.

FIG. 7 is a cross-sectional view showing the essential portions of a brake apparatus for an elevator hoisting machine as a Third Embodiment of the invention. While, in the First Embodiment and the Second Embodiment, the field magnet 27 and the armature 29 are divided and mounted to the brake arms 21A, 21B, in this Third Embodiment, an electromagnetic actuator 54 having a field magnet 51 and an armature 52 integrated by a plurality of pins 53 is mounted to one brake arm 21A.

The pins 53 are passed through holes 52a provided at the armature 52 and screwed into the field magnet 51. The head portions of the pins 53 are provided as stoppers of the opening direction of the armature 52. A sliding pin 55 screwed into the armature 52 is slidably passed through the other brake arm 21B, and the head portion of the sliding pin 55 contacts the brake arm 21B.

As described above, this invention may be applied to an integrated type electromagnetic actuator 54.

Fourth Embodiment

Figure 8:
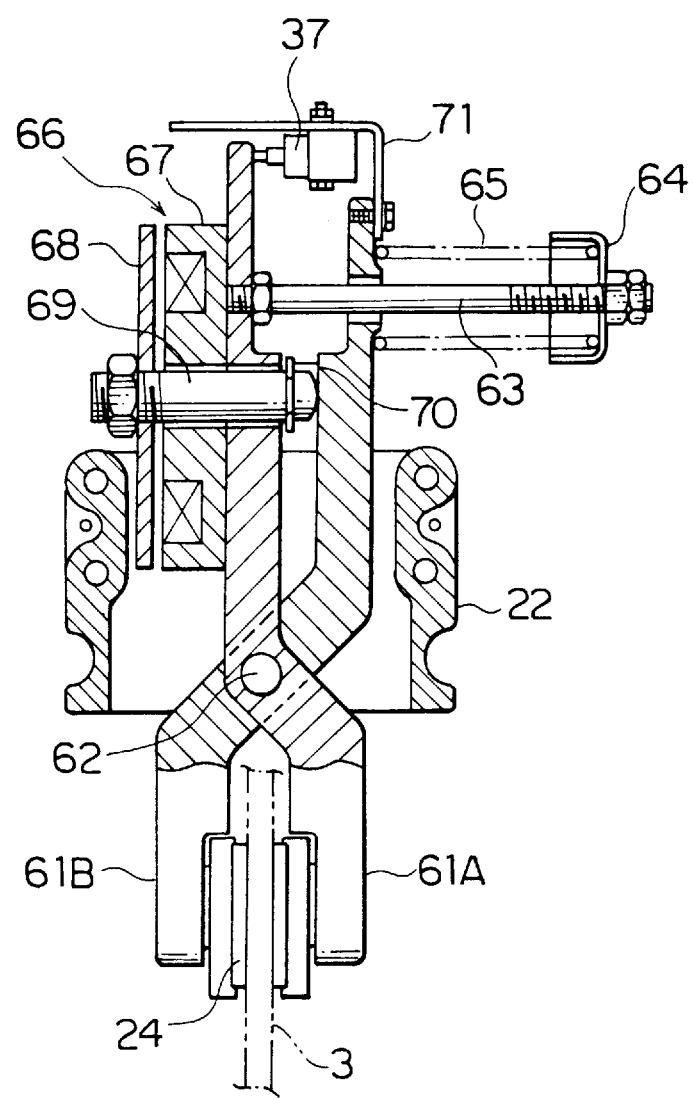
FIG. 8 is a cross-sectional view showing essential portions of a brake apparatus for an elevator hoisting machine as a fourth embodiment of the invention.
Figure 9:
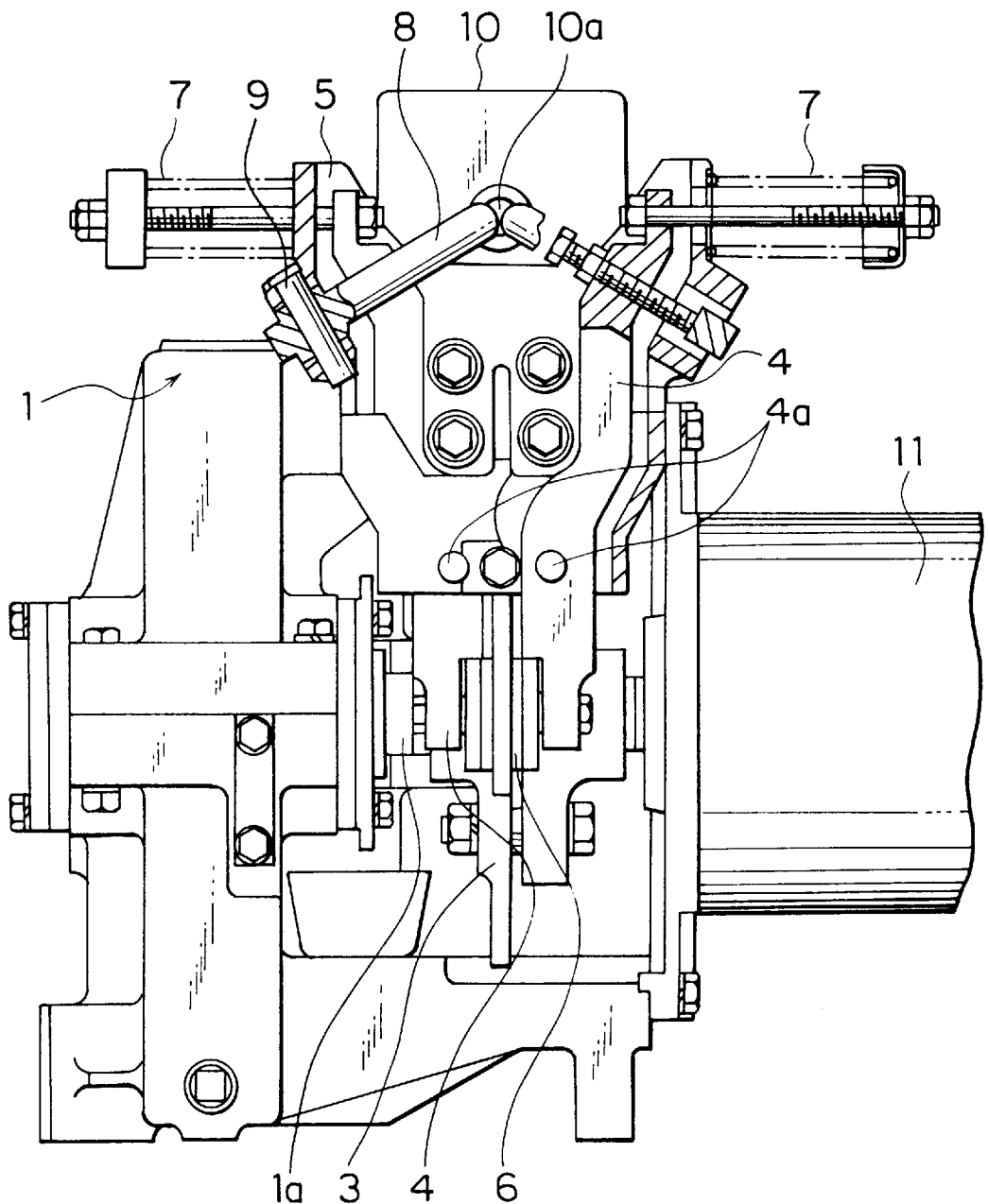
FIG. 9 is a partially cutaway front view showing an example of a conventional brake apparatus.
Figure 10:
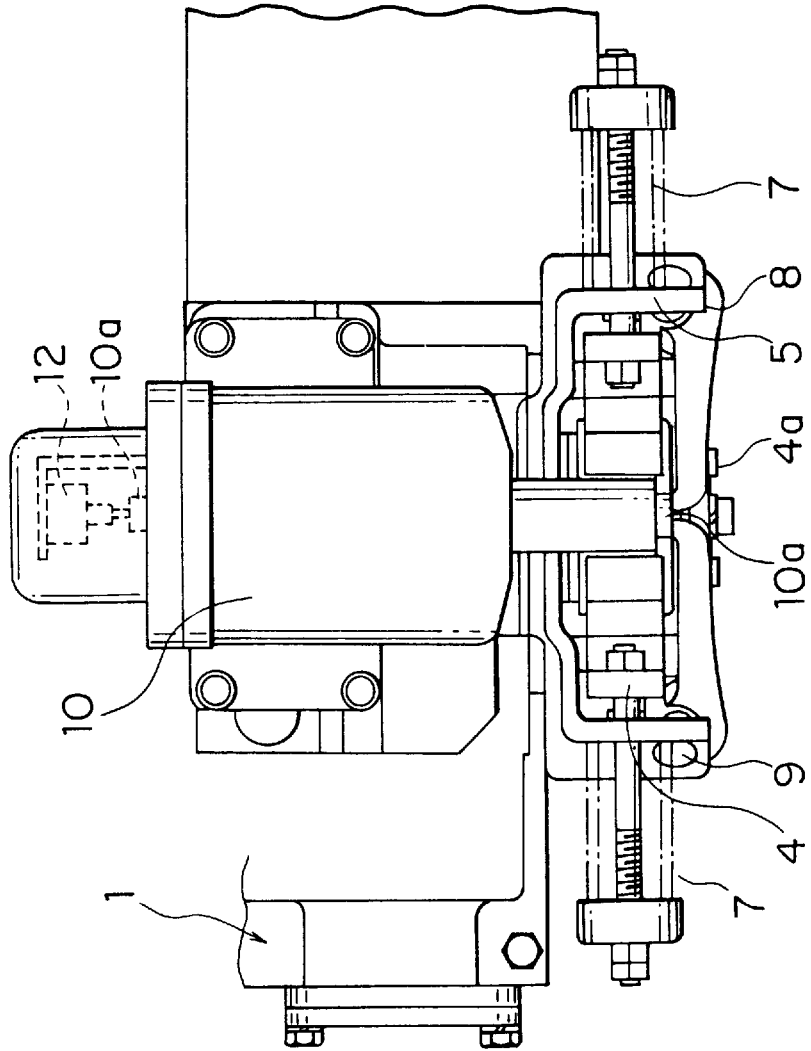
FIG. 10 is a plan view of FIG. 9.
Figure 11:
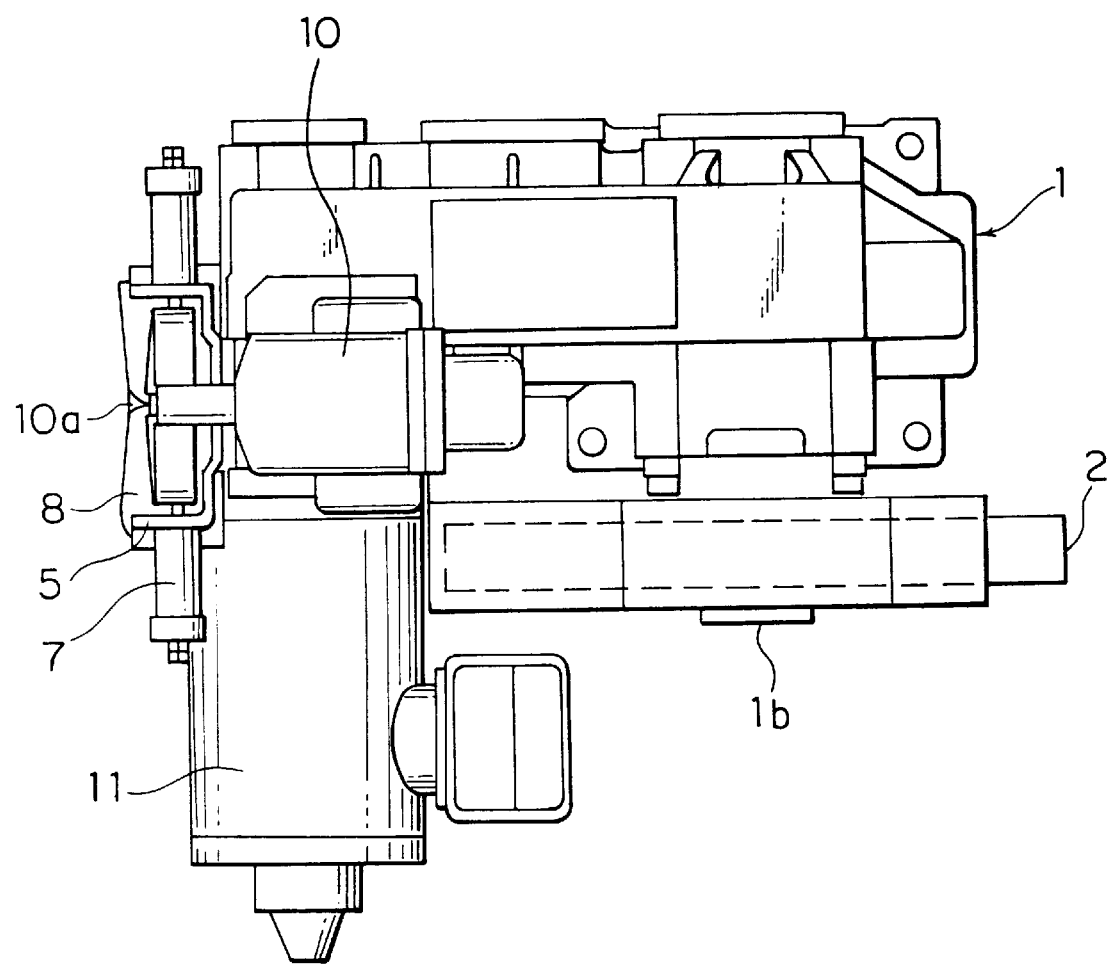
FIG. 11 is a plan view showing an elevator hoisting machine which has the brake apparatus of FIG. 9.
Figure 12:
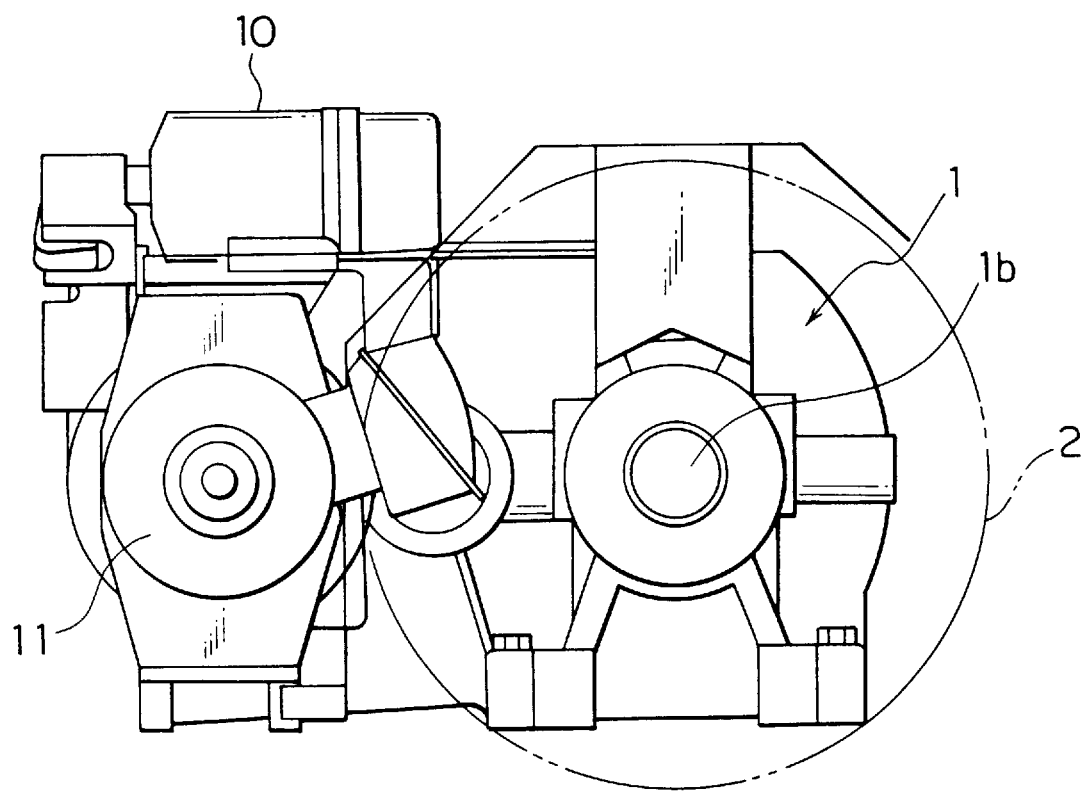
FIG. 12 is a side view of FIG. 11.

FIG. 8 is a cross-sectional view showing the essential portions of a brake apparatus for an elevator hoisting machine as a Fourth Embodiment of the invention. A pair of brake arms 61A, 61B are mounted to the housing 22 through one arm pin 62. One end portion of a spring mounting shaft 63 is screwed into one brake arm 61A. A spring receiving member 64 is fitted to the other end portion of the spring mounting shaft 63. A spring 65 is disposed between the other brake arm 61B and the spring receiving member 64. Both brake arms 61A, 61B are biased by one spring 65 so that both brake shoes 24 are pressed against the brake disk 3.

A field magnet 67 of an electromagnetic actuator 66 is fixed to the outside surface of the one brake arm 61A. A sliding pin 69 is attached to an armature 68 which opposes a field magnet 67. The sliding pin 69 is slidably passed through the field magnet 67 and the brake arm 61A. The tip portion of the sliding pin 69 contacts the other brake arm 61B. A C-shaped stopper ring 70 as a stopper in the opening direction is fitted to the sliding pin 69.

The switch 37 is mounted to the top portion of the brake arm 61B through an L-shaped mounting portion 71. The switch 37 is disposed so as to be operated by the top portion of the brake arm 61A.

In this embodiment, it is possible to simplify the construction of the brake apparatus and further reducing the number of parts, and at the same time reducing the size of the whole brake apparatus even further.

What is claimed is

1. A brake apparatus for an elevator hoisting machine including a drive motor, a driving sheave and a rotating shaft for transmitting a rotating force of said drive motor to said driving sheave, said brake apparatus comprising:

a brake disk disposed on said rotating shaft for rotation therewith;

first and second brake arms pivotally supported from said hoisting machine;

a brake shoe mounted to each of said brake arms for frictional braking of said brake disk;

a biasing arrangement for biasing said brake arms to urge said brake shoes against said brake disk; and an electromagnetic actuator including a field magnet fixed against pivoting to said first brake arm and an armature pivotably mounted on said second brake arm for separating said brake shoes from said brake disk against the action of said biasing arrangement when said electromagnetic actuator is energized.

2. A brake apparatus for an elevator hoisting machine according to claim 1 wherein the fitting angle of said armature is adjustable and an adjustment mechanism is provided on said second brake arm for adjusting said fitting angle of said armature so that said armature and said field magnet having opposing surfaces which are parallel to each other.

3. A brake apparatus for an elevator hoisting machine according to claim 2 wherein the adjustment mechanism comprises an adjustment bolt screwed into the second brake arm and having a tip portion contacting the armature.

4. A brake apparatus for an elevator hoisting machine according to claim 1 further comprising:

a housing for supporting said brake arms; and a stopper having a contact surface for contacting said armature when a braking force by said brake shoes is released, said stopper being attached to said housing so that the position of said contact surface is adjustable.

5. A brake apparatus for an elevator hoisting machine according to claim 1 wherein each of said brake arms has a first end portion and a second end portion and said brake shoes are attached to said second end portions, said brake apparatus further comprising:

a switch mounted to said first end portion of one of said first and second brake arms; and an operating member provided on the other of said brake arms for operating said switch when a braking force by said brake shoes is released.

6. A brake apparatus for an elevator hoisting machine according to claim 5, further comprising:

a mounting member fixed to said first end portion of one brake arm for supporting said switch, a tip portion of said mounting member extending to the vicinity of the other brake arm and having a hole for inserting a hand release lever for manually rotating said brake arms.

7. A brake apparatus for an elevator hoisting machine, including a drive motor, a driving sheave and a rotating shaft for transmitting a rotating force of said drive motor to said driving sheave, said brake apparatus comprising:

a brake disk disposed on said rotating shaft for rotation therewith;

a pair of brake arms pivotally supported from said hoisting machine, each of said brake arms having a first end portion and a second end portion;

a brake shoe mounted to each of said second end portions of said brake arms for frictional braking of said brake disk;

a biasing arrangement for biasing said brake arms to urge said brake shoes against said brake disk;

an electromagnetic actuator for separating said brake shoes from said brake disk against the action of said biasing arrangement to release a braking force;

a switch mounted to said first end portion of one of said pair of brake arms; and an elongated operating member secured the other of said pair of brake arms for operating said switch when said braking force is released.

8. A brake apparatus for an elevator hoisting machine according to claim 7 further comprising:

a mounting member fixed to said first end portion of one brake arm for supporting said switch, a tip portion of said mounting member extending to a vicinity of the other brake arm and having a hole for inserting a hand releasing lever for manually rotating said brake arms.

9. A brake apparatus for an elevator hoisting machine according to claim 7 wherein said elongated operating member changes the switch between an off state when the braking force is applied and an on state when the braking force is released.

10. A brake apparatus for an elevator hoisting machine according to claim 7 wherein a distance by which said elongated operating member projects from the other of said pair of brake arms towards said switch is adjustable.

* * * * *

UNITED STATES PATENT AND TRADEMARK OFFICE
CERTIFICATE OF CORRECTION

PATENT NO. : 5,873,434
DATED      : February 23, 1999
INVENTOR(S): SUGITA et al.

It is certified that error appears in the above-identified patent and that said Letters Patent is hereby corrected as shown below:

Column 8, line 21, after "secured" insert --to--.

Signed and Sealed this

Twenty-seventh Day of July, 1999

Attest:

Q. TODD DICKINSON

*Attesting Officer*        *Acting Commissioner of Patents and Trademarks*